H. HOWARD.
ACID PUMP.
APPLICATION FILED OCT. 23, 1911.

1,051,410.

Patented Jan. 28, 1913.
2 SHEETS—SHEET 1.

WITNESSES
C. H. Walker
K. I. Hulsizer

INVENTOR
Henry Howard
by Byrnes Townsend & Brickenstein
Attorneys

H. HOWARD.
ACID PUMP.
APPLICATION FILED OCT. 23, 1911.

1,051,410.

Patented Jan. 28, 1913.
2 SHEETS—SHEET 2.

WITNESSES

INVENTOR
Henry Howard

UNITED STATES PATENT OFFICE.

HENRY HOWARD, OF BOSTON, MASSACHUSETTS.

ACID-PUMP.

1,051,410.

Specification of Letters Patent. Patented Jan. 28, 1913.

Application filed October 23, 1911. Serial No. 656,299.

*To all whom it may concern:*

Be it known that I, HENRY HOWARD, a citizen of the United States, residing at Boston, in the county of Suffolk and State of Massachusetts, have invented certain new and useful Improvements in Acid-Pumps, of which the following is a specification.

My invention relates to a pump for pumping acids such as sulfuric, hydrochloric, nitric or other acids, and has for its object to provide a device constructed and arranged to obviate the corrosive action of the acids on the materials of which the pump is made. This object I attain by making some of the parts of materials not attacked by the acids, and by so arranging the plunger that it may perform its function without at all coming into contact with the acid being pumped.

Figure 1:
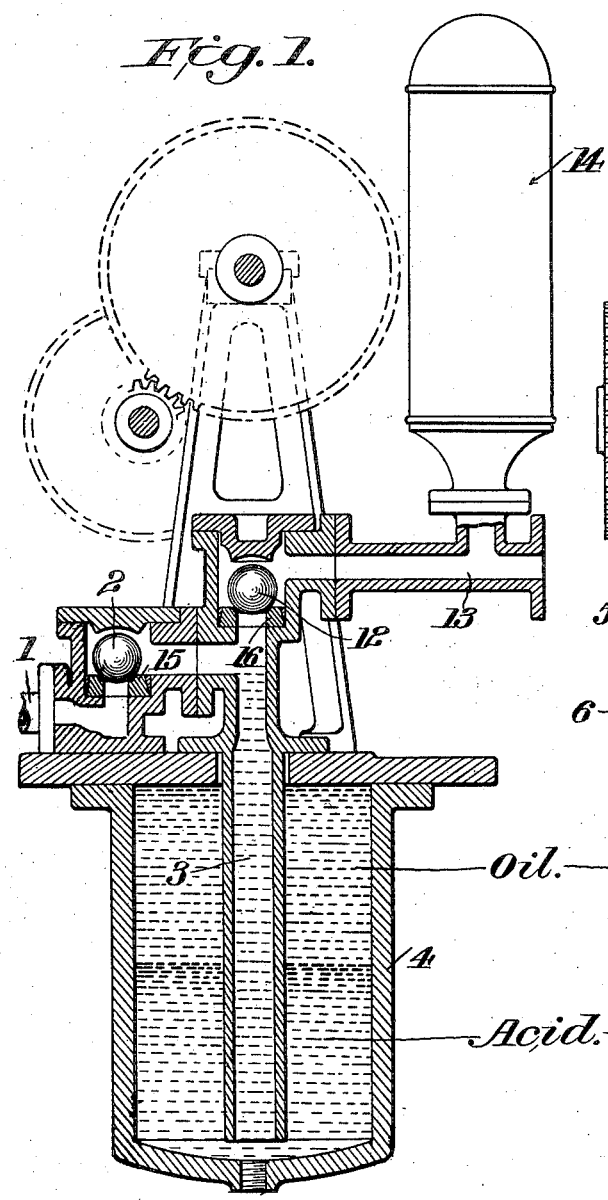
Figure 2:
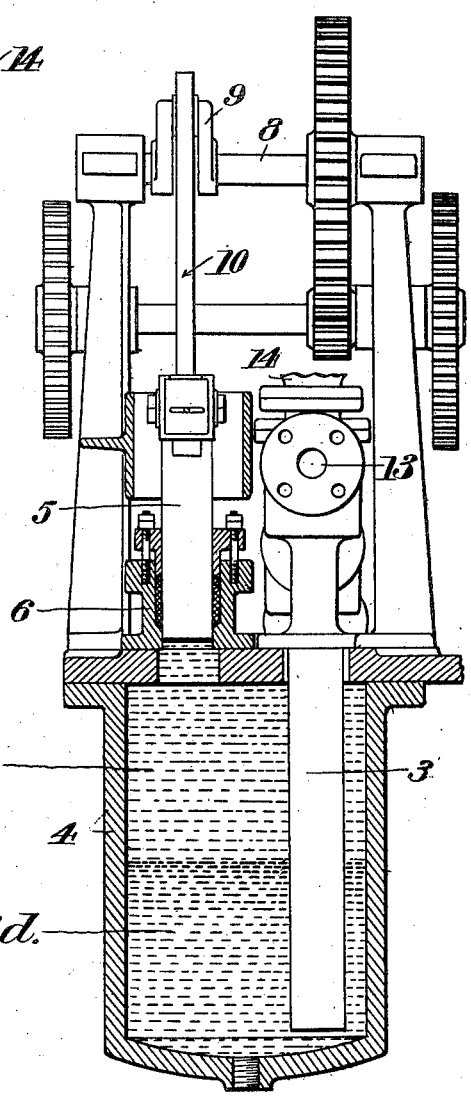
Figure 3:
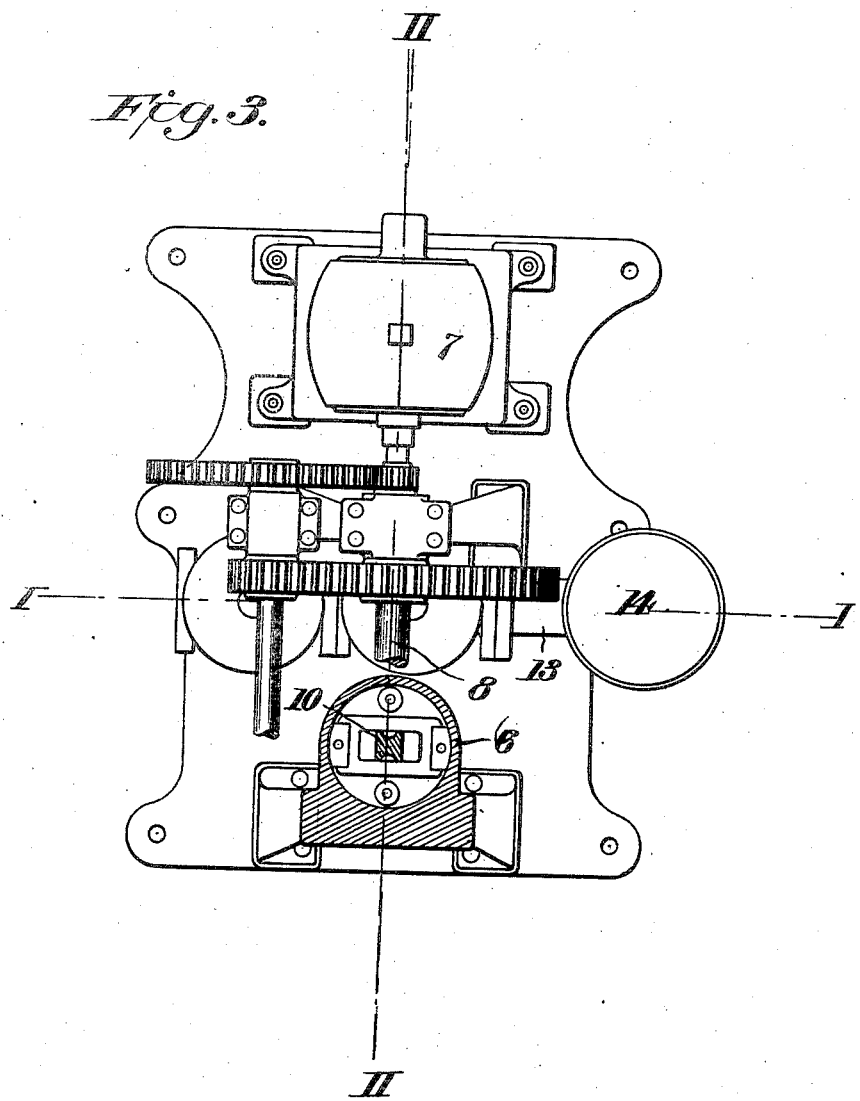

In the drawings—Figure 1 is a sectional elevation on the plane I—I of Fig. 3; Fig. 2 is a sectional elevation on the plane II—II of Fig. 3; and Fig. 3 is a plan.

Referring to the drawings, the acid is sucked in through conduit 1, past check-valve 2, thence into pipe 3, which extends downwardly into the displacement chamber or pot 4. This pot is initially only partly filled with acid, on top of which is a body of oil filling the remaining space in the pot.

A reciprocating plunger 5 working through a stuffing-box 6 is arranged to be operated by a motor 7 (Fig. 2) through a train of gears, crank shaft 8, crank 9 and connecting rod 10. Upon upward movement of the plunger acid is drawn into the pipe 3; upon downward movement of the plunger into the oil, the acid rises in the pipe 3, the check-valve 2 closes, the check-valve 12 opens, and the acid is forced through passage 13, to which is connected, in the usual manner, an air chamber 14.

It will be noted that the pot 4 is considerably larger than the pipe 3 and that the relative sizes of the plunger 5 and pipe 3 are such that a permanent body of acid is maintained in the lower portions of the pot and pipe, so that the plunger does not in its downward movement extend below the layer of oil and thus come into contact with the acid; and that, at the same time, the oil is trapped and prevented from escaping through the pipe 3.

If concentrated sulfuric acid is to be pumped, the pot valves and piping may be made of cast iron. If 60° Baumé acid is to be pumped, all the parts may still be made of iron except the valves 2 and 12 and their seats 15 and 16, which should be made of earthenware. When weak sulfuric acid is to be pumped, the pot, valves, seats and piping should be made of hard lead. In the case of muriatic acid, these parts may be made of either earthenware or hard rubber or a combination of the two; and in the case of nitric acid, earthenware or aluminum would be used.

In operation, the reciprocation of the plunger in the oil alternately causes a flow of acid into and out of the pipe 3. The plunger and its coöperating parts, which, if made of acid-proof material would be either difficult to make or to maintain in operation, can thus be made of the usual materials, while other parts of the pump which must come into contact with the acid can readily be made of acid-proof material.

I claim:—

In an acid pump, the combination comprising a chamber, a plunger extending into the chamber, means for reciprocating the plunger, a pipe open at its bottom extending downwardly into said chamber and containing a fluid piston, inlet and exit conduits each connected to the upper portion of said pipe, and a check-valve in each of said conduits, the parts being so proportioned that the plunger may move within a body of oil superposed on a maintained body of acid sealing the end of the pipe.

In testimony whereof I affix my signature in presence of two witnesses.

HENRY HOWARD.

Witnesses:
E. E. BRAINARD,
L. B. STEARNS.